US009747243B2

(12) United States Patent
Berrebi

(10) Patent No.: US 9,747,243 B2
(45) Date of Patent: Aug. 29, 2017

(54) ELECTRONIC EQUIPMENT FOR THE REPLICATION OF PORTS AND THE ROUTING OF DIGITAL SIGNALS

(71) Applicant: EDEVICE, Mérignac (FR)

(72) Inventor: Marc Berrebi, Mérignac (FR)

(73) Assignee: Edevice, Merignac (FR)

( * ) Notice: Subject to any disclaimer, the term of this patent is extended or adjusted under 35 U.S.C. 154(b) by 349 days.

(21) Appl. No.: 14/378,476

(22) PCT Filed: Feb. 19, 2013

(86) PCT No.: PCT/FR2013/050340
§ 371 (c)(1),
(2) Date: Dec. 5, 2014

(87) PCT Pub. No.: WO2013/124579
PCT Pub. Date: Aug. 29, 2013

(65) Prior Publication Data
US 2015/0081938 A1  Mar. 19, 2015

(30) Foreign Application Priority Data
Feb. 23, 2012  (FR) ...................... 12 51668

(51) Int. Cl.
G06F 13/40  (2006.01)
H04W 4/00  (2009.01)
G06F 13/38  (2006.01)
H04L 12/26  (2006.01)

(52) U.S. Cl.
CPC ........ *G06F 13/4068* (2013.01); *G06F 13/385* (2013.01); *H04L 43/02* (2013.01); *H04W 4/008* (2013.01)

(58) Field of Classification Search
CPC .......... G06F 13/40; G06F 1/32; H04W 4/008
See application file for complete search history.

(56) References Cited

U.S. PATENT DOCUMENTS 6,751,253 B1 * 6/2004 Walance .................. G06F 8/65
                                                375/220
6,775,733 B2 * 8/2004 Chang ................. G06F 13/4004
                                                710/311
7,024,501 B1   4/2006 Wright
(Continued)

FOREIGN PATENT DOCUMENTS

FR  2991543 A1  12/2013

*Primary Examiner* — Henry Tsai
*Assistant Examiner* — Christopher A Daley
(74) *Attorney, Agent, or Firm* — Harness, Dickey & Pierce, PLC

(57) ABSTRACT

The present disclosure relates to a piece of electronic equipment for the replication of ports and the routing of digital signals, intended for secure environments for concentrating signals coming from a plurality of pieces of measuring equipment, as well as communication with a piece of supervising equipment. The equipment includes: —N ports whereof M ports are electrically insulated by optoelectronic coupler, N being an integer greater than or equal to 1, and M being an integer between N-1 and N, —a radiofrequency interface with a matched piece of supervising equipment, —a processor performing a protocol conversion between the radiofrequency protocol and the protocol of the ports.

8 Claims, 2 Drawing Sheets

(56) References Cited

U.S. PATENT DOCUMENTS

| | | | |
|---|---|---|---|
| 8,447,910 B1* | 5/2013 | Yi | G06F 13/385 |
| | | | 455/41.2 |
| 2002/0093946 A1 | 7/2002 | Schinazi | |
| 2006/0056401 A1 | 3/2006 | Bohm et al. | |
| 2006/0061963 A1 | 3/2006 | Schrum | |
| 2007/0028018 A1* | 2/2007 | Giroud | H04W 88/02 |
| | | | 710/62 |
| 2008/0195788 A1 | 8/2008 | Tamir et al. | |
| 2008/0198148 A1* | 8/2008 | Miyata | G09G 3/2096 |
| | | | 345/204 |
| 2009/0049307 A1 | 2/2009 | Lin | |
| 2009/0216497 A1* | 8/2009 | Schwiers | H04Q 9/00 |
| | | | 702/188 |
| 2010/0057969 A1 | 3/2010 | Meiri et al. | |
| 2010/0217803 A1* | 8/2010 | Biondi | G06F 13/385 |
| | | | 709/204 |
| 2010/0225493 A1* | 9/2010 | Zishaan | F24F 11/0017 |
| | | | 340/627 |
| 2011/0039426 A1* | 2/2011 | Lee | G06K 19/07732 |
| | | | 439/76.1 |
| 2011/0171903 A1* | 7/2011 | Toebes | H04W 76/02 |
| | | | 455/14 |
| 2011/0196211 A1 | 8/2011 | Al-Ali et al. | |
| 2012/0190304 A1* | 7/2012 | Wang | H04W 84/18 |
| | | | 455/41.2 |

* cited by examiner

ELECTRONIC EQUIPMENT FOR THE REPLICATION OF PORTS AND THE ROUTING OF DIGITAL SIGNALS

CROSS-REFERENCE TO RELATED APPLICATIONS

This application is a National Phase Entry of International Application Serial No. PCT/FR2013/050340, filed on Feb. 19, 2013, which claims priority to French Patent Application Serial No. 1251668, filed on Feb. 23, 2012, both of which are incorporated herein by reference herein.

FIELD

The present invention concerns the field of connector technology in a secure environment, in particular for medical applications imposing asepsia constraints, or in a sterile environment, or in an explosive environment. It concerns more precisely a port-replication device for connecting a plurality of items of equipment such as sensors to supervision equipment connected to a radio-frequency concentration device, in particular a computer tablet, a computer, a smartphone or a router.

BACKGROUND

Portable computers often use an accessory mechanically and electrically connected for associating a standard set of peripherals such as a monitor, an external keyboard, an external mouse or pointing peripheral, the printer and other cabled peripherals. These accessories are commonly known as a port docking or replication station. A physical connection is established between the portable computer and the docking station, at the time when the docking station supplies the ports necessary for connecting to these peripherals. The main aim of the replicator is to provide a rapid and practical mechanism for enabling the portable computer to attach itself to or detach itself from these peripherals without having to physically disconnect each of the respective cables of the computer.

Although the solutions available today for a replicator make it possible to provide a certain level of ease with regard to rapid connection/disconnection, they often raise preoccupations concerning costs and reliability. Connection boxes comprising a series of USB ports and integrating teletransmission means according to a protocol such as Wi-Fi or Bluetooth are also known in the prior art. For example, the American patent application US 2006/061963 is known, describing a wireless docking station comprising a computer having a first wireless transmitter/receiver, and at least one peripheral device having a second wireless transmitter/receiver. The computer and the peripheral dialogue by establishing a wireless connection, the computer automatically detecting the presence of the peripheral and the driver software associated with the peripheral.

The American patent application US 2008/195788 describes a wireless docking station for enabling a wireless connection between a computing device and a plurality of peripherals, the wireless docking system comprising:
  a wireless transmitter/receiver for communicating with the computing device on a wireless medium;
  a switch coupled to the wireless transmitter/receiver and a plurality of input/outputs (I/O) of the controllers, and
  a plurality of controllers I/O for communicating with one or more of the plurality of peripherals.

The connection between a peripheral and the I/O controller is established for example by a USB connection, a parallel connection, an RS232 serial connection, a PS/2-style mouse connection, a keyboard connection, an SATA (serial advanced technology attachment) port, a VGA (video graphics array) port, a DVI (digital visual interface) port or an HDMI (high-definition multimedia interface) port.

The American patent application US 2010/057969 describes another example of a wireless docking station enabling a connection between a computing device and a plurality of peripherals. The modular wireless docking station comprises at least one wireless transmitter/receiver and at least one antenna for communicating with the computing device over a wireless medium, and a plurality of interfaces for communicating with one or more in the plurality of peripherals. The American patent application US 2009/049307 describes a USB port replicator, an apparatus comprising a processor for processing and converting data, and a Wi-Fi communication module. The USB ports make it possible to connect USB electronic devices, such as a USB key or a printer.

When the electronic device is connected to the USB port, the processor receives a connection data signal through the USB port and converts the format data connection signal in Wi-Fi in accordance with the format communication protocol, and then transmits the data of the connection signal via the Wi-Fi communication wireless server to a personal computer or a digital tablet. The user can remotely use the electronic device connected to the wireless remote apparatus via the USB port replicator.

The American patent U.S. Pat. No. 7,024,501 describes a device comprising:
  a wireless communication interface having a first wireless communication channel configured to receive wireless control signals from a first wireless interface device and a second wireless communication channel configured to receive wireless control signals from a second wireless interface;
  a control interface having a communication port configured to transmit the wireless control signals received both from the first wireless interface and from the second interface.

The communication port is a USB (universal serial bus) port configurable for transmitting control data received from a plurality of interfaces. The control interface comprises abusreinitialisation means that enables the second wireless communication channel to respond to the traffic directed to a different communication port.

According to another variant, the radio-frequency interface consists of one or more interfaces using a transmission protocol with a small action radius. This protocol is for example the high-level protocol developed by the ZigBee Alliance enabling short-distance communication, with reduced power consumption, based on the IEEE standard 802.15.4 for personal-size networks.

Advantageously, the electronic equipment according to the invention automatically provides the conversion of a proprietary or standard profile used by a cabled peripheral to a standard profile used by a virtual RF peripheral associated with the cabled peripheral. According to a variant, the equipment masks the disconnection phases of a cabled peripheral by maintaining a virtual peripheral on an RF interface. According to another variant, the equipment according to the invention automatically provides the conversion of several proprietary or standard profiles used by several cabled peripherals to a proprietary or standard profile used by a single virtual RF peripheral associated with several cabled peripherals.

The solutions of the prior devices are not compatible with use in sensitive environments, for example a hospital environment or in the case of telemedicine or an explosive environment, involving strict standards with respect to electrical protection. NF EN 60 601-1 determines for example the general electrical safety rules for medical equipment. It defines the leakage currents and patient auxiliary currents to be measured. The limit values of these currents are fixed in accordance with the classification of the equipment.

Many of them are the subject of specific standards that modify or supplement the general standard. The combined study of these standards makes it possible to develop electrical safety control procedures. These include the identification of equipment, the list of necessary equipment, the installation diagram and the results.

However, when equipment such as an oximetry analysis sensor or ECG (electrocardiogram) sensors are connected to a port replicator of the prior art, the standards are no longer complied with. This is because the multiplicity of ports may lead to connecting, to the replicator, apart from equipment in accordance with the electrical standard, other non-conforming equipment. It may be a case for example of audio-visual equipment inadvertently connected to the port replicator, or any equipment that a user connects to the replicator in order to benefit from access to a computer or a remote tablet, profiting from the universality of these ports.

The ports of the replicators of the prior devices do not prevent propagation of the leakage current from a defective item of equipment to the other ports and therefore to the medicalised equipment, therefore risking causing serious disturbances or even risks for the patient. The same applies to replicators used in explosive environments.

SUMMARY

In order to remedy these drawbacks, the invention concerns, in accordance with its most general acceptance, electronic equipment for replicating ports and routing digital signals intended for secure environments for concentrating signals coming from a plurality of items of measuring equipment on the one hand, and communication with supervision equipment on the other hand, including:
  N ports, whereof M ports are electrically isolated by opto-electronic coupler, N being an integer greater than or equal to 1, and M being an integer between N−1 and N,
  a radio-frequency interface with matched supervision equipment,
  a computer effecting a protocol conversion between the radio-frequency protocol on the one hand and the interface protocol on the other hand. Preferably, N is greater than 3. The device according to the invention makes it possible to comply with the requirements for data systems used by medical instruments (medical device data systems, MDDS), laid down in particular by the American authorities (the Food and Drug Administration—FDA) for benefiting from a simplified procedure for access to the market for equipment complying with the required demands in terms of security and performance.

BRIEF DESCRIPTION OF THE DRAWINGS

The invention will be better understood from a reading of the following description concerning a non-limitative example embodiment illustrated by the accompanying drawings, where.

DETAILED DESCRIPTION

Figure 1:
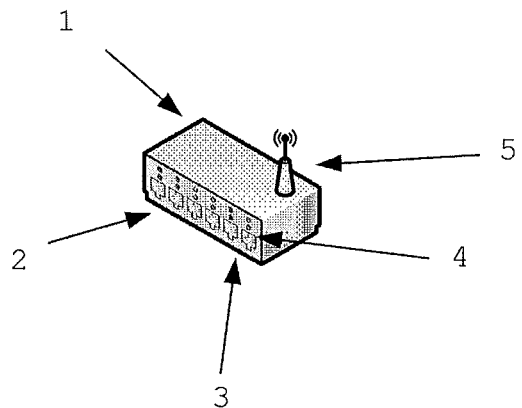
FIG. 1 depicts a schematic view of a device according to the invention.
Figure 2:
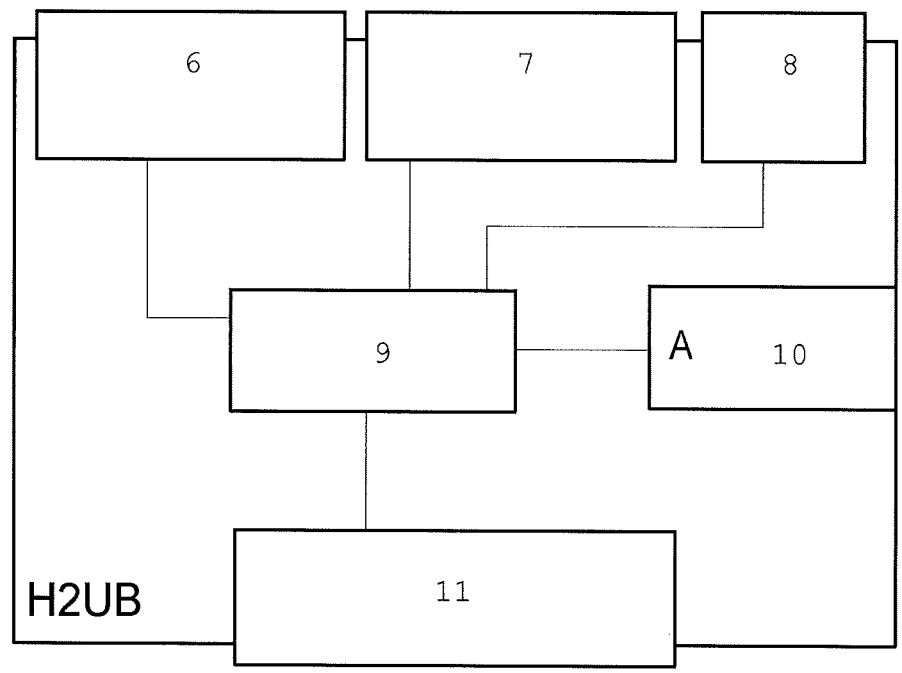
FIG. 2 depicts the outline diagram of the device according to the invention.

The equipment according to the invention consists of a self-contained box (1) having one or more USB connectors (2), one or more serial connectors (3), one or more antennas (5) for broadcasting a short-range radio signal of the Bluetooth or Wi-Fi type, LEDs (4) indicating the connection state and an internal processor responsible for managing the aforementioned communication interfaces. The equipment is a self-contained box, the correct functioning of which requires only an internal (battery) or external (mains unit) power supply source. FIG. 2 depicts the outline diagram of the device. It comprises an electronic circuit comprising serial interfaces (6), USB interfaces (7) and the circuit controlling the LED indicators (8).

A computer (9) carries out the processing operations of management of the protocols used and the conversion of the signals for constructing, from the input and output signals coming from the serial (6) and USB (7) interfaces, a signal according to an exchange protocol of the Wi-Fi or Bluetooth type delivered to a radio-frequency interface (11). A secure power supply in accordance with medical electrical standards (10) provides the power supply to the various circuits. Each serial (6) and USB (7) interface is isolated by an electrical isolation circuit, for example a coupler providing galvanic isolation, such as an optocoupler.

During the phases of connection of the peripheral, the device optionally proceeds with its powering up if the electrical interface of the peripheral so demands, and then the computer next behaves as a traditional host that will manage the peripheral by exchanging the messages provided by the protocol. The computer will in particular identify the serial number of the equipment as well as the type of profile used to be able to proceed with the emulation of an RF virtual peripheral intended to be controlled by the supervision equipment.

If the peripheral disconnects or is powered down, the device may optionally not indicate it to the supervision equipment and continue to emulate the peripheral inertly in order not to trigger repeated connection/disconnection phases on the supervision equipment. This masking of disconnection will then be effective until the same peripheral or an equivalent peripheral according to the configuration of the device is reconnected. If a request is submitted to the virtual peripheral by the supervision equipment and requires dialog with the disconnected or powered-down peripheral, the masking then ends by signifying the disconnection of the peripheral.

With regard to the protocol the computer will in particular extract the information contained in standardised profile used for example by the suppliers of USB peripherals such as PHDC (personal healthcare device class), serial port or audio profiles. The processor will then determine what type of profile is best suited for retranscribing this information issuing from one or more cabled peripherals to the supervision equipment through the RS interface by implementing an RF peripheral emulation. The processor will thus automatically transfer data contained in a PHDC profile to an HDP (health device profile) on a peripheral emulated in Bluetooth or to a ZHC (ZigBee healthcare) profile on a peripheral emulated in ZigBee. The emulation of peripherals using standard protocols will also make it possible to avoid any installation of specific software on the supervision equipment. Thus a USB or serial peripheral requiring a proprietary software/driver can be used from the supervision equipment without the latter requiring the presence of previously installed specific software, since the functions of said specific software are performed by the computer of the device.

When several peripherals are redirected to the same RF application protocol, the computer will also be able to effect an applicative multiplexing by grouping together all the data issuing from the USB or serial peripherals to a single virtual peripheral emulated in RF, which will include several categories or types of service each taking the data issuing from the USB or serial peripherals. This emulated virtual "meta" peripheral will be able to be accessible from the supervision equipment through standard software but also require the installation of a specific software/application/driver that will guarantee correct recovery of the data. The installation of said software will be able to be effected through an Internet connection available on the supervision equipment or directly via the RF interface between the device and the supervision equipment.

Variant Embodiments

Optionally, a single port may be non-isolated, the device then being provided with an isolated power supply (10) in accordance with the aforementioned standards. In summary, it is possible to implement various configurations:
one or more ports all isolated, any power supply
one port non-isolated and optionally several ports isolated, and an isolated power supply.

The processor (9) and the radio interface circuit (11) convert signals to the teletransmission protocol. Wi-Fi, and/or Bluetooth and/or GSM. In the case of Wi-Fi teletransmission, the conversion is in accordance with the standard 802.11. The physical layer offers three types of information coding and processes the signals coming from or intended for the interfaces (6, 7) in order to code them in accordance with the specifications of the standard 802.11.
The data connection layer, consisting of two sublayers:
logical link control (LLC);
media access control (MAC).
The RF interface (11) defines the modulation of the radio waves and the characteristics of the signalling for the data transmission, while the processor (9) provides the data connection and defines the interface between the bus of the machine and the physical layer, in accordance with an access method close to that used in the Ethernet standard and the rules for communication between the various stations.

Operating Mode

In order to connect the various items of USB or serial equipment, the user connects them to the box (1) that will replicate them on the Bluetooth or Wi-Fi local wireless interface. The user can then consult his graphical terminal in order to directly access the equipment connected to the device. Following the connection of a new item of cabled equipment, the device detects this equipment electrically and dialogs therewith by behaving as the main driver of the equipment. The processor (9) next simulates the presence of a new item of virtual wireless equipment so that it is detected by the graphical terminal close by.

During the phase of installation of the newly detected virtual wireless equipment, the processor (9) responds to all the requests sent. In nominal functioning, the processor (9) provides the transfer and formatting of the information issuing from the cabled equipment from/to the remote tablet or computer while complying with the selected wireless protocols. When the cabled equipment is disconnected by the user, the processor (9) informs the tablet or computer of this in accordance with the protocol used.

The device described concerns in particular the field of home health by making possible the use of existing medical equipment having cabled (USB/serial) connectivity from a graphical terminal (tablet/portable computer or smartphone) without requiring connections to the latter. Beyond this sector of activity, the use of the device appears to be advantageous whenever an item of cabled equipment is deemed to communicate with a graphical computer integrating a local wireless connection (Bluetooth, Wi-Fi, etc.), in particular for responding to the following problems:
absence of connectors on the computer or tablet;
risk of wear on the connectors of the computer or tablet in the case of great repetition of the connections/disconnections;
immediate connection of the equipment with the computer or tablet as soon as the latter is within radio range of the device;
extension of the distance between the equipment and the computer or tablet up to the maximum range of the radio link used with the device;
control of several items of equipment simultaneously;
compliance with security or isolation distances.

The device may thus be useful for various and varied applications in the industrial, commercial or general-public sector, such as for example:
automobile: connection of USB keys that communicate with a cellular telephone;
retail outlet: connection of USB loyalty card reader, USB printer and USB barcode reader with a tablet used by the checkout girl;
general public: connection of a digital camera via USB and a USB printer to the device for transfer and printing of images after display on a tablet.

The device may be enhanced with additional functionalities that will facilitate taking control thereof or extending the capacities of the graphical terminal connected:
LCD screen with button for offering a richer user interface;
integration of a means of connection to the Internet (Ethernet, Wi-Fi, 3G, 4G, RTC) that is in particular made available to the supervision equipment through the RF link to allow connection of said equipment to the Internet;
memory card or chip card interface.

Figure 3:
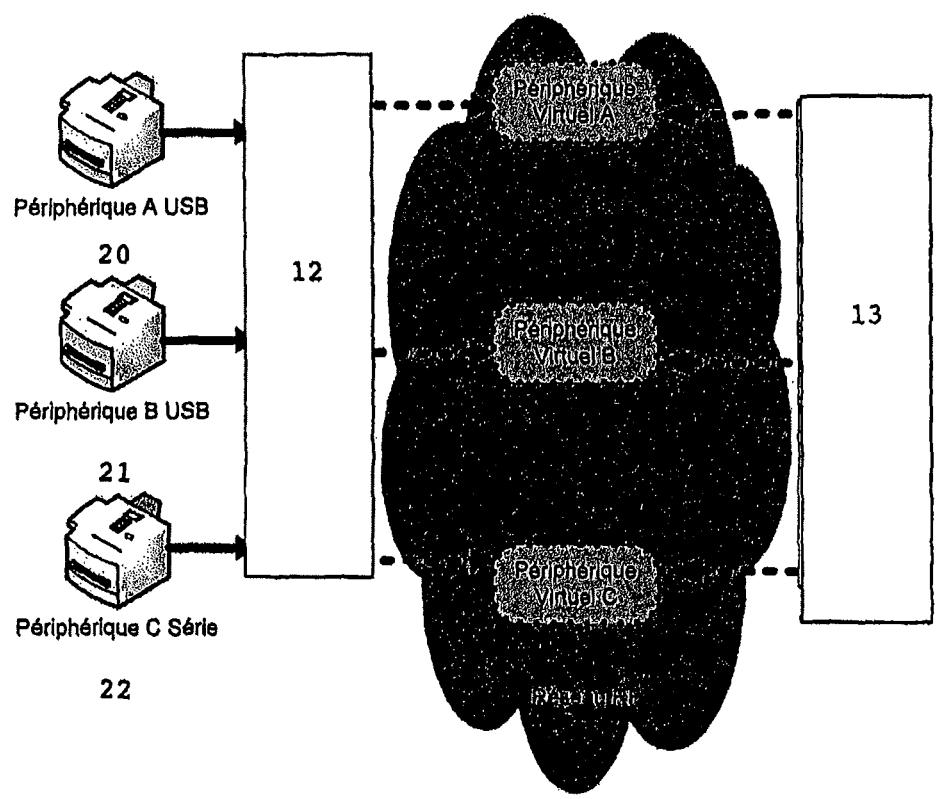
FIG. 3 depicts a schematic view of the use of a device according to the invention.

FIG. 3 depicts a schematic view of the context of use of the device (12), which makes it possible to virtualise peripherals (20, 21, 22) connected by a USB port to enable supervision by equipment (13) communicating through a wireless radio-frequency network.

The invention claimed is:
1. Electronic equipment for the replication of ports and the routing of digital signals, intended for secure environments for concentrating signals coming from a plurality of measurement signals and communicating with supervision equipment, the electronic equipment comprising:

end ports, whereof M ports are electrically isolated by opto-electronic coupler, N being an integer greater than or equal to 1, and M being an integer between N−1 and N;

a radio-frequency interface with matched supervision equipment; and a processor implementing a protocol conversion between the radio-frequency protocol and the port protocol;

the radio-frequency interface including one or more interfaces using a transmission protocol with a short radius of action; and the electronic equipment masking phases of disconnection of a cabled peripheral while maintaining a virtual peripheral on a RF interface.

2. The electronic equipment according to claim 1, wherein N is greater than 3 and M is equal to N−1.

3. The electronic equipment according to claim 1, wherein at least some of the ports are USB ports.

4. The electronic equipment according to claim 1, wherein at least some of the ports are serial ports.

5. The electronic equipment according to claim 1, wherein the radio-frequency interface is a Wi-Fi interface.

6. The electronic equipment according to claim 1, wherein the radio-frequency interface includes one or more Bluetooth interfaces.

7. The electronic equipment according to claim 1, further comprising automatically converting a proprietary or standard profile used by a cabled periphery to a standard profile used by a virtual RF periphery associated with the cabled periphery.

8. The electronic equipment according to claim 1, further comprising automatically converting several proprietary or standard profiles used by several cabled peripherals to a proprietary or standard profile used by a single virtual RF peripheral associated with several cabled peripherals.

* * * * *